W. H. Trissler,

Faucet.

No. 4,054. Reissued June 28. 1870.

Inventor

W. H. Trissler

Per Burridge & Co.,

Attorneys

Witnesses.

Frank Alden

D. L. Humphrey

N. PETERS, PHOTO-LITHOGRAPHER, WASHINGTON, D. C.

United States Patent Office.

WILLIAM H. TRISSLER, OF CLEVELAND, OHIO.

*Letters Patent No.* 102,624, *dated May* 3, 1870; *reissue No.* 4,054, *dated June* 28, 1870.

IMPROVEMENT IN FAUCETS.

The Schedule referred to in these Letters Patent and making part of the same.

*To all whom it may concern:*

Be it known that I, WILLIAM H. TRISSLER, of Cleveland, Cuyahoga county and State of Ohio, have invented certain new and useful Improvements in Faucets; and I do hereby declare that the following is a full and complete description of the same, reference being had to the accompanying drawing making part of this specification.

*Drawing.*

Figure 1:
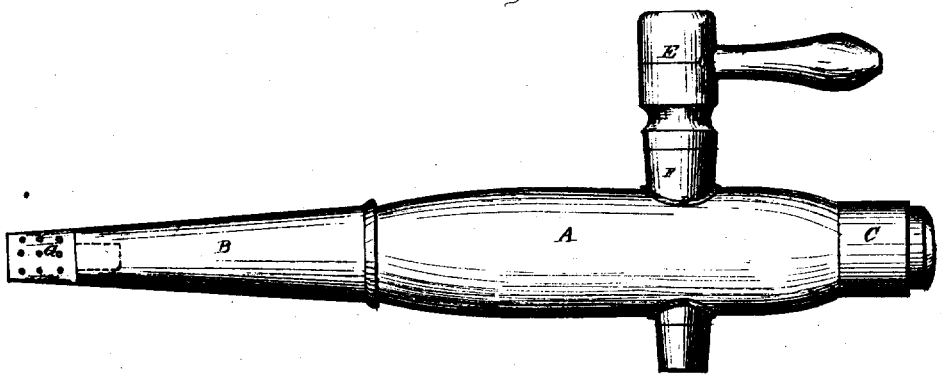
Figure 2:
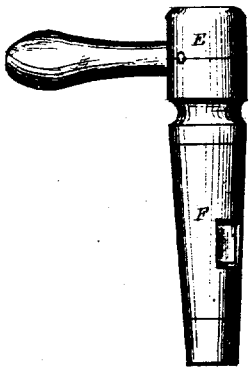
Figure 3:
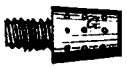

Figure 1 is a side view of the faucet.
Figure 2, a detached view of the key.
Figure 3, a detached section.
Like letters refer to like parts in the several views.

*Description.*

The nature of this invention relates to a certain combination of metal and wood in the construction of faucets, whereby there is obtained to them the harmlessness and purity of the wood, with the strength and advantages of the metal, as hereinafter set forth.

In fig. 1, A represents the body of the faucet, constructed of wood, and which may be of the shape and size of those in common use.

The stem of the faucet is covered with a metallic shield or shell, B, closely fitted thereon, and secured in any desirable manner.

Around the butt end is a ring, C, for the purpose of strengthening the head.

The key-hole may be lined with a leather bush, D, or some other equivalent material.

The key E, fig. 2, of the faucet is also constructed of wood, around the stem of which is cast, or otherwise secured, the shell F.

When cast, the key is placed in a suitable mold, and the molten metal poured into it, and flows around the stem, forming a shield upon it.

The advantages resulting from the above-described arrangement and combination of the shield or shell B, with the stem, and the shield F around the key E, are as follows, viz:

It is well known to those having extensive use of faucets that the stems of those made entirely of wood are very liable to break or split, and a shoulder is formed on the stem by the contraction of that portion of it in the tap-hole, in consequence of the compression to which it is subjected on being driven into the tap-hole, and more especially is this the case when they are often driven in and withdrawn, which, in many instances, occurs several times a day; hence, the faucet soon becomes so injured and useless that new ones are required.

As the tap-holes are not of a uniform size, the original tapering form of the faucet-stem is destroyed by repeated driving into the tap-hole, and causing the shoulder before mentioned, which, in many cases prevents the faucet from being held in the tap-hole, or so insecurely that there is much leakage, and, at the same time, it is very liable to slip out of the tap-hole, producing waste of the liquor from the cask.

That part of the faucet which is driven into the barrel is of less strength than the other part of it, owing to the reduced size of the stem, while the bore through it is the same as at the key-hole. Hence, the slightest part of the faucet is that which is driven into the tap-hole, and which should be the strongest, and which becomes so by the use of the shield B.

To avoid these objections in the matter of wood faucets, metal ones have been resorted to, which are not only more expensive than wooden ones, but are seriously objectionable from their imparting to the contents of the cask, in which they are used, a peculiar metallic taste, and particularly that remaining in the bore of the faucet, either in consequence of the kind of metal used, or from the chemical effect that the liquor may have upon them. Hence, wooden faucets are preferable, from their more pure and harmless character, and are, therefore, more extensively used; but their want of permanence, under the conditions before mentioned, is one object of this invention to secure, with the advantages of a wood faucet.

By covering the stem with a shell, as before described, it possesses a strength to resist compression, on being driven into the tap-hole, equal to a metallic one, and, at the same time, has the purity of the wooden faucet, as the liquor is drawn off through the wooden stem. Hence, no bad taste is imparted to said liquor.

The keys of wood faucets are also made of wood, which, in consequence of their being soaked by the fluids, become soft, and, by frequent use, soon wear away, and the taps become leaky. This objection is also avoided by my faucet, as that part of the key fitted to and working in the chamber of the body is protected by a shield, F, above referred to. Hence, the wood is protected from abrasion, and will, therefore, be more secure and durable.

The faucet may be provided with a strainer, G, fig. 1, a detached view of which is shown in fig. 3. Said strainer may or may not be used, as the condition or nature of the liquors may require. When used for drawing ale or beer, in which hops are used, the strainer will be found of practical use.

*Claims.*

What I claim as my improvement in faucets, and desire to secure by Letters Patent, is—

1. The shield or shell B, covering the shank A of a wood faucet, substantially as and for the purpose set forth.

2. The shell F, investing the wooden key E, constructed and arranged substantially as and for the purpose set forth.

3. The herein-described faucet, consisting of a wooden body, A, shield B, key E, and shell F, constructed and combined in the manner and for the purpose substantially set forth.

WILLIAM H. TRISSLER.

Witnesses:
A. L. CHAMPION,
J. H. BURRIDGE.